Figure 1:
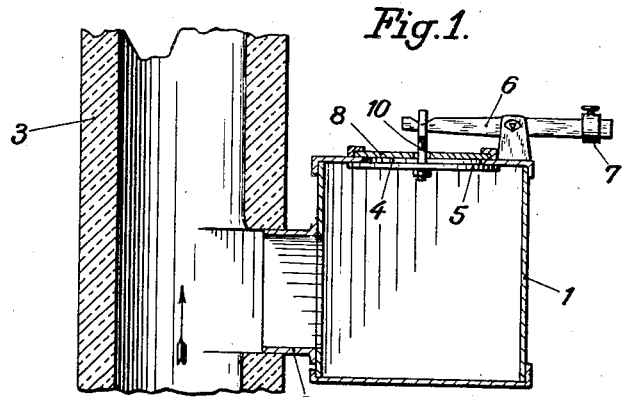

April 9, 1929.  G. KORNGIEBEL  1,708,310

DRAFT REGULATOR FOR FLUES OR CHIMNEYS

Filed May 22, 1928  2 Sheets-Sheet 1

Inventor:
Gustav Korngiebel,
by
Att'y.

April 9, 1929.　　　G. KORNGIEBEL　　　1,708,310
DRAFT REGULATOR FOR FLUES OR CHIMNEYS
Filed May 22, 1928　　　2 Sheets-Sheet 2
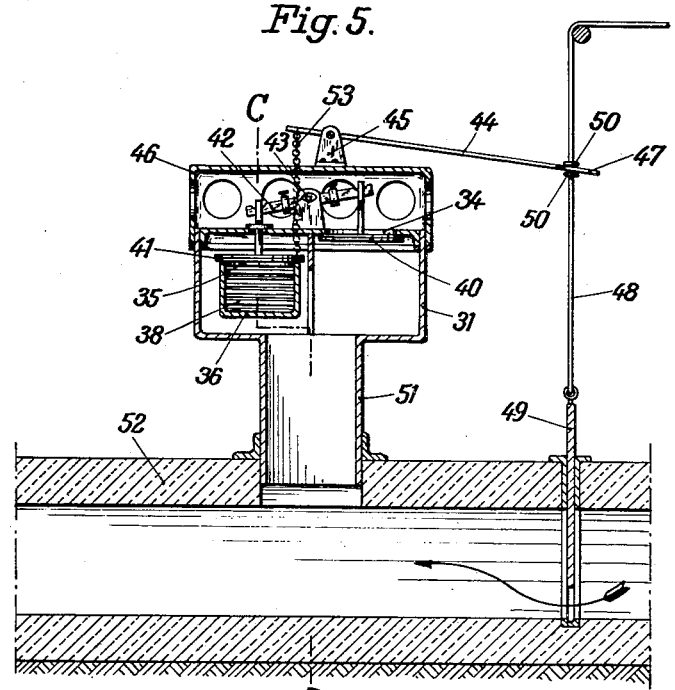
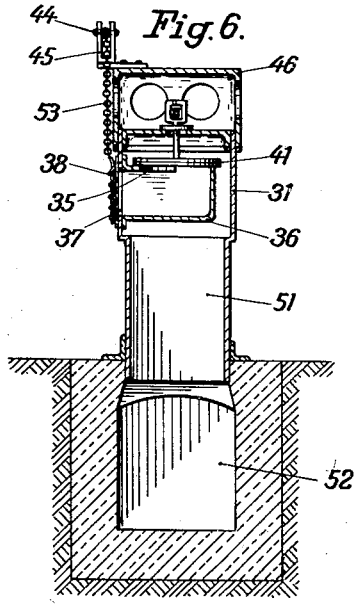
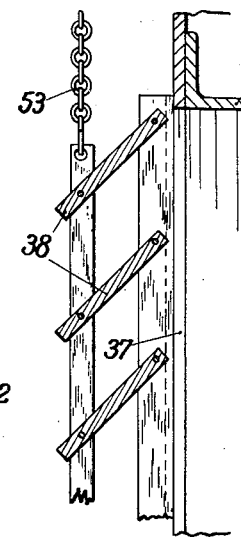
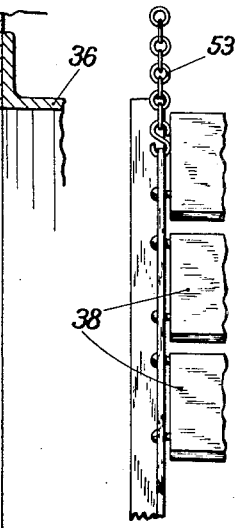
Inventor:
Gustav Korngiebel, Patented Apr. 9, 1929.

1,708,310

UNITED STATES PATENT OFFICE.

GUSTAV KORNGIEBEL, OF CASSEL, GERMANY.

DRAFT REGULATOR FOR FLUES OR CHIMNEYS.

Application filed May 22, 1928, Serial No. 279,802, and in Germany July 23, 1926.

This invention relates to a draft regulator to be connected with a flue or a chimney for regulating the draft by letting enter variable portions of air. The regulator is of the kind described in my U. S. Patent 1,615,588, and it consists of a casing communicating with the flue channel or with the chimney and having an air inlet or opening which, in accordance with the difference between the atmospheric pressure and the lower pressure in said channel or chimney, can be closed more or less by means of a regulating plate or disk; such plate or disk being suspended freely from a counterweighted means so that it is balanced in any position, means being provided for varying the resistance of the regulating plate or disk to the difference in pressure. In the apparatus described in my said prior patent said means consist in a weight adjustably mounted on or suspended from an arm of the balancing means. My present invention relates to an improvement of this regulator and consists in substituting the adjustable weight by an adjustable throttling member throttling the entering air. By this means the regulator becomes more sensitive, for the inertia of the movable parts is diminished and the throttling of the entering air is a means which does not depend upon the inertia of the weighted movable parts.

The invention will be best understood from a consideration of the following detailed description taken in connection with the accompanying drawings forming a part of this specification, with the understanding that while on the drawings several embodiments of the invention are disclosed, the invention is not confined to any strict conformity with the showing of the drawings, but may be embodied in any manner which does not make a material departure from the salient features of the invention.

In the drawings:—

Figure 2:
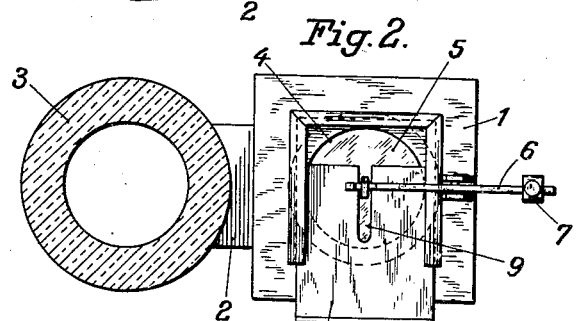
Figures 3, 4:
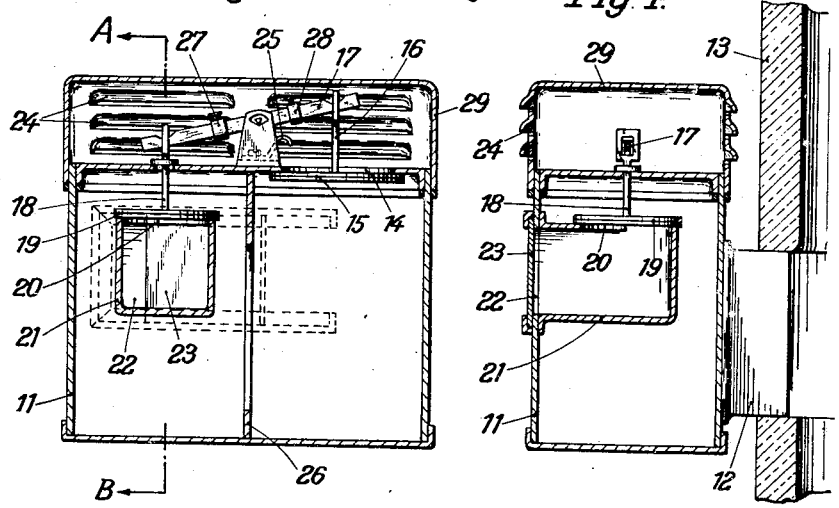

Fig. 1 shows in vertical section the draft regulator connected by way of example with a chimney, Fig. 2 is a top view of Fig. 1, Fig. 3 shows in vertical section, a modified form of construction in which the air-inlet opening is divided in two each of same being provided with a regulating plate or disk, Fig. 4 is a vertical section according to the line A—B of Fig. 3 seen in the direction of the arrows shown in Fig. 3, Fig. 5 shows in vertical section another modified form of construction in which the closing movement of the throttling member is accompanied by an opening movement of the flue damper and vice versa, Fig. 6 is a vertical section according to the broken line C—D of Fig. 5, Fig. 7 shows, on a larger scale, a partial section of a Venetian blind shown in Fig. 6, Fig. 8 is a partial end view of Fig. 7.

In Figs. 1 and 2 of the drawings the draft regulator consists of a casing 1 connected by means of a tubular socket 2 with the inside of a chimney 3. The casing is on the top side provided with an opening or inlet 4 which is circular in the example shown and through which outer air can enter. The opening 4 can be closed by a regulating plate or disk 5 being freely suspended from a lever or balance arm 6. The latter is provided with a small adjustable weight 7 by means of which the regulating disk 5 can be balanced exactly so that even a slight over-pressure of the outer air over the pressure within the casing 1 is sufficient to begin an opening movement of the disk 5 if the opening 4 is fully uncovered. According to this invention an adjustable throttling member shown in the form of a slidable cover 8 is provided slotted at 9 for free passage of the rod 10 by means of which the regulating disk is suspended. This slidable cover can be adjusted by hand. It is obvious that by more or less closing the opening 4 by means of the cover 8, the area upon which the pressure of the outer air acts on the regulating disk may be altered within broad limits and correspondingly the action of the counterweight of the lever or balancing arm 6. While in Figs. 1 and 2 the cover 8 is shown slidable immediately on the top of the casing 1 there may be arranged on the said top above the opening 4 a short tubular socket flanged on its top, the slidable cover 8 being slidable on the top flange.

In the modified form of Figs. 3 and 4 the casing 11 is connected by a tubular socket 12 with a chimney 13. This casing is in the same manner as in Figs. 1 and 2 on its top provided with an opening or inlet 14 through which outer air can enter. This opening may be closed by means of a regulating plate or disk 15 suspended freely by means of a rod 16 from a balancing arm or lever 17. From the other end of said balancing arm 6 in this modified construction is suspended by means of a rod 18 a second regulating plate or disk 19 which, if the first disk 15 borders from beneath against the edge of the opening 14, rests from above upon the edge of the opening 20 of a tubular socket 21 arranged within the casing 11 and having sideways an opening 22 which may be closed more or less by means of a slidable cover 23 for throttling the entering air. To protect the balancing arm 17 against damage from outside a protecting cap 29 is provided having slots or opening 24 for the free passage of air. On the balancing arm 17 there are provided small adjusting weights 27 and 28 for balancing the two regulating disks 15 and 19 mutually. Preferably a spring 25 or the like may be provided as a cushion to catch shocks in the case of a strong turn of the balancing arm 17. A perforated partition or web 26 may be provided to stiffen the top of the casing. It may be observed that in the modified constructional form of Figs. 3 and 4 the single air-inlet opening shown in Figs. 1 and 2 is subdivided into two openings, and in consequence the single regulating disk is substituted by two, the slidable cover 23 by means of which the cross area of the air entrance can be altered, being arranged at the air inlet 22 only, that means being the opening through which the outer air has a passage to the second regulating disk 19.

In the modifications shown by way of example in the drawings the throttling member is shown as a rectangular slidable cover; obviously such slidable cover may be substituted by a circular cover having radial slots and being rotatable on a fixed cover with corresponding radial slots, or by a Venetian blind or in Figs. 3 and 4 by a butterfly valve arranged within a prolongation of the tubular socket 21. Further, the air entrance in the modified form of Figs. 3 and 4 is shown as subdivided in two openings 14 and 20 one of which is smaller than the other one; obviously, the two openings could be made of equal diameters and in such case the balancing arm must be fulcrumed exactly at the midst. Further, the tubular socket is shown sideways on the casing to connect the latter with a chimney. In cases in which the casing is to be connected with a horizontal flue or channel the tubular socket may be arranged on the bottom of the casing, if sideways of the said flue or channel there is not a sufficient space, and in consequence the draft regulator is arranged above the top of said flue or channel.

In plants requiring varying forces of draft it is preferable to adjust the throttling member directly in accordance with the adjusting of the usual flue damper effected by the attendant or fireman. A modified construction for such purpose is shown in Figs. 5 and 6. In these drawings, 31 is the casing of the draft regulator similar in construction to that of Figs. 3 and 4. The air inlet is subdivided in two openings 34 and 35, which in this case are of same diameters. The opening 35 is arranged on a tubular socket 36 provided within the casing 31 and having a side-opening 37 for the entering air. The opening 37 can be closed or opened by means of a Venetian blind 38. The regulating disk 40 for the air-inlet opening 34 and the second disk 41 for the opening 35 of the tubular socket 36 are of same size and weight, and in consequence are suspended from a balance arm 42 fulcrumed midway at 43. To open and close the Venetian blind 38 a tension rod, rope, band or chain 53 is provided and suspended from a lever 44 fulcrumed at a support 45 being mounted on the perforated protecting cap 46 of the casing 31. The other free end of the lever 44 is forked at 47 and straddles with its fork the rope or chain 48 of the usual flue damper 49. Stops 50 fastened on said rope or chain take along the lever 44 if the attendant or fireman adjusts the flue damper by means of the rope or chain 48. Arrangement and leverage of the lever 44 are such that, if the fuel damper is wholly or nearly closed, the Venetian blind is in the open position and gives free and whole cross section of the air entrance 37 of the tubular socket 36. If, vice versa, the flue damper 49 is wholly lifted the Venetian blind 38 is in the closed position so that no air can enter into the tubular socket 36. As shown from the drawings, in this modified construction the casing 31 is mounted by means of a vertical tubular socket 51 upon the flue channel 52. Instead of a Venetian blind a butterfly valve may be provided within an outside promulgation of the tubular socket 36, and in this case the adjusting lever of such butterfly valve may be connected by a link-rod with the short end of lever 44.

I claim:

1. A draft regulator for flues, chimneys and the like comprising in combination a casing communicating by an opening with the flue, chimney or the like, and having an air inlet, a freely suspended regulating plate or disk in said casing exposed to atmospheric pressure and adapted to open and close the air inlet or opening of the casing in accordance with the difference between the atmospheric pressure and the air pressure in said flue, chimney or the like, counterweighted means arranged outside of said casing and from which the said regulating plate or disk is suspended so that it is balanced in any position, such means comprising a balancing arm on which as a counterweight opposite to the said regulating plate or disk is suspended a second regulating plate or disk adapted to open and close a subdivided portion of the said air inlet or opening and an adjustable throttling member adapted to throttle the entering air by covering more or less the air inlet to the said second regulating plate or disk.

2. A draft regulator for flues, chimneys and the like comprising in combination a casing communicating by an opening with the flue, chimney or the like, and having an air inlet, a freely suspended regulating plate or disk in said casing exposed to atmospheric pressure and adapted to open and close the air inlet or opening of the casing in accordance with the difference between the atmospheric pressure and the air pressure in said flue, chimney or the like, counterweighted means arranged outside of said casing and from which the said regulating plate or disk is suspended so that it is balanced in any position, and as means for varying the resistance of the regulating plate to the difference in the air pressure an adjustable throttling member adapted to throttle the entering air, an adjustable flue damper and means by which the closing movement of the flue damper is accompanied by an opening movement of the throttling member and vice versa.

In testimony whereof I affix my signature.

GUSTAV KORNGIEBEL.